US009121359B2

(12) United States Patent
Allmond

(10) Patent No.: US 9,121,359 B2
(45) Date of Patent: Sep. 1, 2015

(54) STEPPED IDLE RETURN FOR MULTIAIR EQUIPPED ENGINES WITH HIGH AERATION

(71) Applicant: Christopher L. Allmond, Rochester Hills, MI (US)

(72) Inventor: Christopher L. Allmond, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 350 days.

(21) Appl. No.: 13/715,212

(22) Filed: Dec. 14, 2012

(65) Prior Publication Data

US 2014/0172268 A1 Jun. 19, 2014

(51) Int. Cl.

| | |
|---|---|
| ***G06F 19/00*** | (2011.01) |
| ***F02D 41/08*** | (2006.01) |
| ***F01L 9/02*** | (2006.01) |
| *F02D 41/22* | (2006.01) |
| *F02M 3/06* | (2006.01) |
| *F02D 41/00* | (2006.01) |

(52) U.S. Cl.

CPC ................. *F02D 41/08* (2013.01); *F01L 9/025* (2013.01); *F01L 2250/02* (2013.01); *F01L 2800/11* (2013.01); *F01L 2800/13* (2013.01); *F01L 2820/01* (2013.01); *F02D 41/083* (2013.01); *F02D 41/086* (2013.01); *F02D 41/221* (2013.01); *F02D 2041/001* (2013.01); *F02D 2200/023* (2013.01); *F02M 3/06* (2013.01)

(58) Field of Classification Search

CPC ....... F02D 41/16; F02D 41/08; F02D 41/083; F02D 41/086; F02D 41/221; F02M 3/06

USPC .................. 701/102, 110; 123/339.1, 339.14, 123/339.15, 339.24

See application file for complete search history.

(56) References Cited

U.S. PATENT DOCUMENTS

| | | | | |
|---|---|---|---|---|
| 5,605,128 | A * | 2/1997 | Nusser et al. | 123/339.24 |
| 5,623,902 | A * | 4/1997 | Nusser et al. | 123/339.16 |
| 6,758,187 | B2 * | 7/2004 | Waters | 123/198 F |
| 7,007,645 | B2 * | 3/2006 | Park | 123/90.15 |
| 7,168,410 | B2 * | 1/2007 | Kato et al. | 123/339.15 |
| 7,527,028 | B2 * | 5/2009 | Leone | 123/90.15 |
| 2012/0046848 | A1 * | 2/2012 | Suwa et al. | 701/102 |

* cited by examiner

*Primary Examiner* — Lindsay Low
*Assistant Examiner* — Robert Werner
(74) *Attorney, Agent, or Firm* — Ralph E Smith

(57) ABSTRACT

A method and system for controlling the engine during a return to idle maneuver when the engine's oil is highly aerated. The system and method will implement a stepped return to idle maneuver when the engine oil has a predetermined amount of aeration. The predetermined amount of aeration is an amount that could cause an engine to stall due to valve lift loss if the engine speed were reduced to the idle speed in the conventional manner.

19 Claims, 4 Drawing Sheets

STEPPED IDLE RETURN FOR MULTIAIR EQUIPPED ENGINES WITH HIGH AERATION

FIELD

The present disclosure relates generally to the control of internal combustion gas engines and, more particularly, to a method and system for controlling the engine during a return to idle when the engine's oil is highly aerated.

BACKGROUND

With the development of advanced valve train technologies (e.g., MultiAir®), it is now possible to control the amount of air used for combustion in each individual engine cylinder. A vehicle equipped with such technology (often referred to as variable valve actuation technology) manages the torque and power delivered by the engine by varying the lift profile of intake valves without direct use of a throttle. Instead, air intake is controlled using electro-hydraulic components that include a valve tappet, moved by a mechanical intake cam, connected to the intake valve through a hydraulic chamber that is controlled by a solenoid valve. The vehicle's engine control unit provides optimum intake valve opening schedules throughout the operation of the engine.

Standard engine oil is used as the valve operating fluid in the variable valve actuated engines described above. At high engine speeds, the oil is pressurized and typically free from air or air bubbles, which is desirable. However, when the oil pressure drops, air can effervesce from the oil (via e.g., the oil gallery), causing the oil to become aerated, which is not desirable.

One known situation where oil aeration can occur is when the engine speed is returned to idle. During a return to idle maneuver, oil pressure drops and air can effervesce from the oil. It has been discovered that valve lift can be lost due to a return to idle, especially in conditions of high oil aeration. FIG. 1 is a graph illustrating example test results for an engine that was running at 4,000 RPM (revolutions per minute) for a period of time before initiating a return to idle maneuver (i.e., air injection was shut off along with a command to reduce the speed). Oil aeration in this example was set to 19% and engine idle speed was the typical 700 RPM.

The x-axis of the FIG. 1 graph represents the number of crankshaft revolutions since the return to idle was initiated. Likewise, the y-axis of the FIG. 1 graph represents the amount of lift a particular intake valve experienced since the return to idle was initiated. As can be seen, significant valve lift was lost once the return to idle was initiated. In the illustrated example, there was over a 2.5 mm loss. This significant loss of valve lift can cause the engine to stall, which is undesirable and dangerous. Accordingly, there is a need and desire for a mechanism to control an engine during a return to idle maneuver that will not cause significant valve lift loss when the engine's oil is aerated.

SUMMARY

In one form, the present disclosure provides a method of controlling an engine of a vehicle to set a speed of the engine to a predetermined idle speed. The method comprises determining, at a processor, if the engine's oil is highly aerated; and if the engine's oil is highly aerated, setting, via the processer, the engine speed to an intermediate idle speed for a predetermined time period before setting the engine speed to the predetermined idle speed.

The present disclosure also provides an engine system of a vehicle. The system comprises a solenoid valve connected to a cylinder head connected to the engine; and a controller connected to the solenoid valve and the engine. The controller adapted to set a speed of the engine to a predetermined idle speed by determining if the engine's oil is highly aerated; and if the engine's oil is highly aerated, setting the engine speed to an intermediate idle speed for a predetermined time period before setting the engine speed to the predetermined idle speed.

Further areas of applicability of the present disclosure will become apparent from the detailed description provided hereinafter. It should be understood that the detailed description, including disclosed embodiments and drawings, are merely exemplary in nature intended for purposes of illustration only and are not intended to limit the scope of the invention, its application or use. Thus, variations that do not depart from the gist of the invention are intended to be within the scope of the invention.

DETAILED DESCRIPTION

The disclosed system and method will implement a stepped return to idle maneuver when engine oil has a predetermined amount of aeration. The predetermined amount of aeration is an amount that could cause an engine to stall due to valve lift loss if the engine speed were reduced to the idle speed in the conventional manner. It is believed that the air bubbles within the oil gallery grow and coalesce when oil pressure drops at low engine speeds. If the engine speed is allowed to first dwell at an intermediate calibratable engine speed for a calibratable amount of time before returning to the typical idle speed (e.g., 700 RPM), then valve lift loss is substantially eliminated. The system and method disclosed herein are suitable for use with MultiAir® and other variable valve actuation systems/vehicles.

Figure 2:
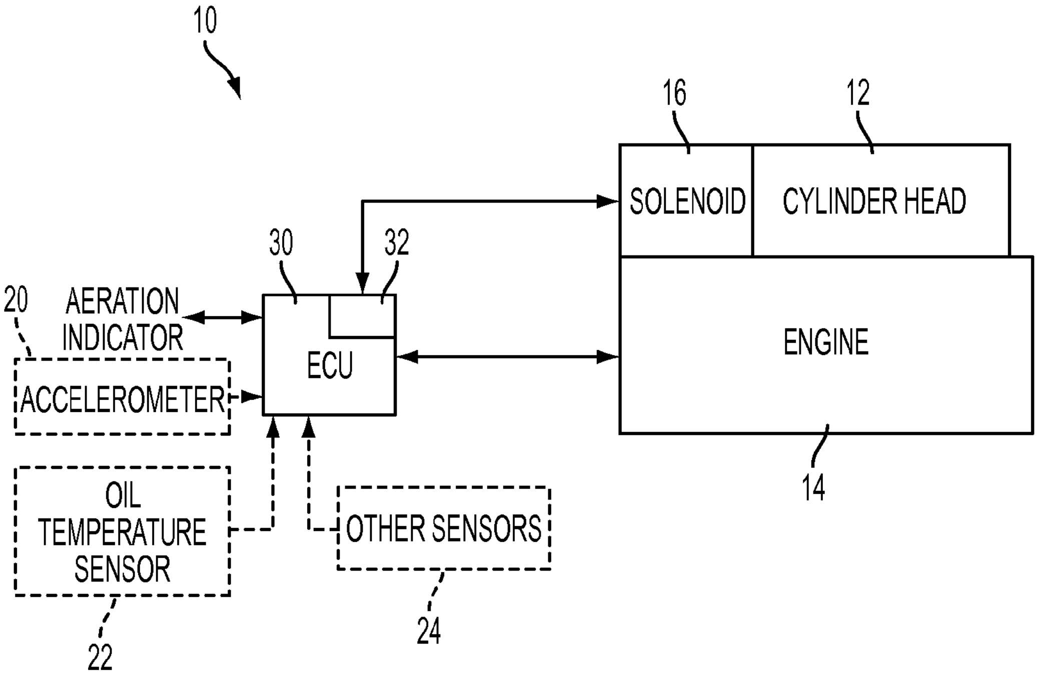
FIG. 2 illustrates a system for controlling an engine during a return to idle maneuver according to an embodiment disclosed herein.

FIG. 2 illustrates an example system 10 for a vehicle that may be programmed to perform the novel control method 100 (FIG. 3) disclosed herein. The system 10 comprises a cylinder head 12 connected to an engine 14 and a solenoid valve 16. The solenoid valve 16 controls the opening and closing of intake valves within the cylinder head 12. Although shown separate, the solenoid valve 16 could be located within the cylinder head 12. Moreover, other components (e.g., pressure chamber) needed for a variable valve actuation system (e.g., a MultiAir® system) are not shown for clarity purposes. It should be appreciated that FIG. 2 illustrates one example system 10 and the principles disclosed herein are not limited solely to the FIG. 2 illustrated configuration.

The engine 14 is also connected to an engine control unit (ECU) 30 or similar type controller. The ECU 30 could be a processor programmed to perform the method 100 discussed below and/or other necessary controller functions. The ECU 30 includes a valve control module (VCM) 32 that controls the timing of the solenoid valve 16, which is used to control the opening/closing of the intake valves. The ECU 30 can receive an engine speed or other input from the engine 14 or a sensor attached to the engine that indicates what the engine speed is.

The ECU 30 is adapted to set, clear, and read an oil aeration indicator. The indicator could be a software variable that is stored in a memory within the ECU 30 or external to the ECU 30. Alternatively, or in addition to, the oil aeration indicator could be a hardware register that is part of the ECU 30 or external to the ECU 30, as desired. The oil aeration indicator will have a first value indicating that the engine's 14 oil is aerated (in accordance with the disclosed principles) and a second value indicating that the engine's 14 oil is not aerated.

In one embodiment, the aeration indicator will be set when the engine speed and amount of time the engine was at the speed indicates that aeration is probable. Known aeration percentages based on engine speed and the time at speed will be stored in a table or hardware registers accessible by the ECU 30. In an example embodiment, the aeration indicator will be set when the engine speed and time the engine was at the speed indicate that there is at least an 18% aeration of the engine oil. It should be appreciated that the subject matter disclosed herein is not limited to an 18% aeration of the oil and that any amount of aeration can be used to set the aeration indicator.

Moreover, other factors can be used to determine whether the oil is aerated enough to cause potential valve lift loss. That is, oil aeration can be effected by the dynamic operation of the vehicle. For example, when a vehicle makes sharp turns, the engine oil can enter the timing chain's case and touch the timing chain, which can cause additional aeration. Thus, having inputs from accelerometers can help determine whether the manner in which the vehicle is being driven is causing additional aeration of the engine oil. In addition, the oil's temperature could be an indication of aeration.

Thus, the disclosed system 10 can optionally include inputs from one or more accelerometers 20, and oil temperature sensor 22 or other sensors that can be used to determine oil aeration. The ECU 30 could use one or more of these inputs to determine the amount of aeration and set the aeration indicator. In another embodiment, the system 10 can input oil pressure from e.g., an oil pressure sensor and then perform an analysis (e.g., a Fourier analysis) on the oil pressure to determine if the oil is aerated, as the inventors have determined that air bubbles tend to damp high frequency content. It should be appreciated that the subject matter disclosed herein is not limited to how the aeration of the oil is determined. For example, aeration could be determined based on the existing VCM aeration algorithm, if desired. Moreover, the subject matter disclosed herein is not limited to when the ECU 30 makes the oil aeration computation/determination. That is, the oil aeration computation/determination can be performed periodically as a background or other process performed by the ECU 30.

Figure 3:
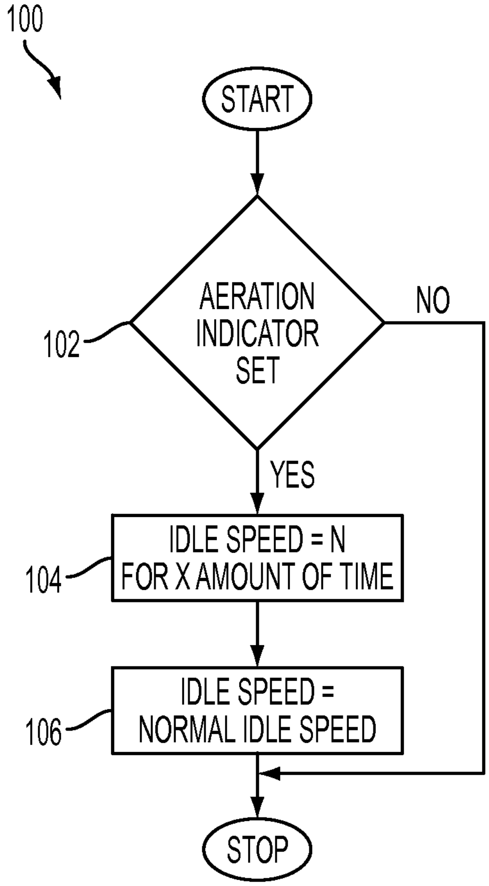
FIG. 3 illustrates a flowchart of a method of controlling an engine during a return to idle maneuver according to an embodiment disclosed herein.

FIG. 3 illustrates a method 100 of controlling the system 10 during a return to idle maneuver in accordance with an embodiment disclosed herein. In a desired embodiment, the method 100 is implemented in software, stored in a computer readable medium, which could be a random access memory (RAM) device, non-volatile random access memory (NVRAM) device, or a read-only memory (ROM) device) and executed by the engine control unit 30, which may be or include a processor, or other suitable controller within the system 10 of FIG. 2. Moreover, the computer readable medium can be part of the ECU 30.

The method 100 should be run when the ECU 30 or other vehicle sensor/module detects that a return to idle maneuver is being performed. For example, the ECU 30 can detect that an accelerator pedal "tip-out" was performed. An accelerator pedal "tip-out" is the action of a driver releasing the accelerator pedal from a depressed position to a completely released or mostly released position. Regardless of how return to idle maneuver is detected, or how/when the method 100 is executed, the method 100 begins when the ECU 30 determines whether the aeration indicator is set to the first value indicating that the engine's 14 oil is "highly" aerated (step 102). As mentioned above, in one example embodiment, the aeration indicator will be set to the first value if there is at least an 18% aeration of the engine oil. If at step 102, it is determined that the aeration indicator is not set to the first value (i.e., the engine's 14 oil is not "highly" aerated), the method 100 terminates.

However, if at step 102, it is determined that the aeration indicator is set to the first value indicating that the engine's 14 oil is "highly" aerated, the method continues at step 104 to initiate a stepped return to idle maneuver. That is, instead of immediately returning the engine to its normal idle speed (e.g., 700 RPM), step 104 will set the idle speed to an intermediate value "N" for predetermined a period of time "X". The ECU 30 and the VCM 32 will control the solenoid valve 16 and engine 14 to set the engine 14 to the intermediate idle speed N. The exact value of the intermediate value N will be determined by a calibration process. Likewise, the predetermined time period X will be determined by the calibration process. During the calibration process, the engine 14 can be tested in a manner described below with reference to FIG. 4 to find optimal values for the intermediate idle speed N and time period X that will substantially minimize valve lift loss.

After time X has elapsed, the method 100 continues at step 106 where the idle speed is set to the engine's normal idle speed. The ECU 30 and the VCM 32 will control the solenoid valve 16 and engine 14 to set the engine 14 to the normal idle speed. The engine 14 will idle at the normal speed and because valve lift loss has been substantially eliminated, the engine will not stall. Thus, the method 100 implements a calibratable controlled return to idle after sustained high RPM driving or other driving conditions. The controlled, stepped return to idle will substantially prevent valve lift loss and ensure that the engine will not stall.

Figure 1:
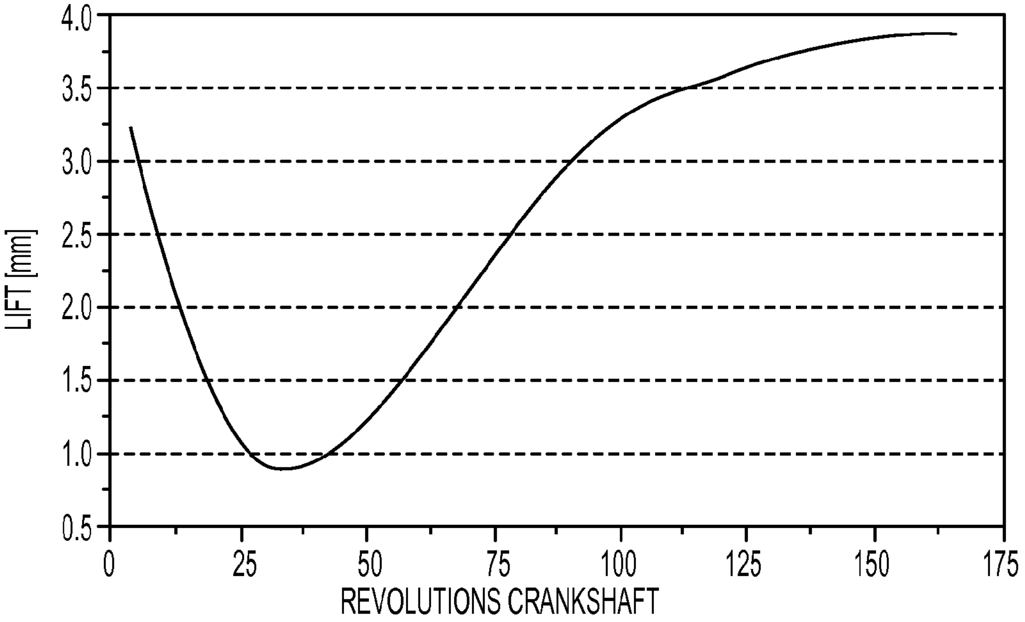
FIG. 1 is a graph that illustrates valve lift loss after a return to idle maneuver was initiated and when engine oil is highly aerated.
Figure 4:
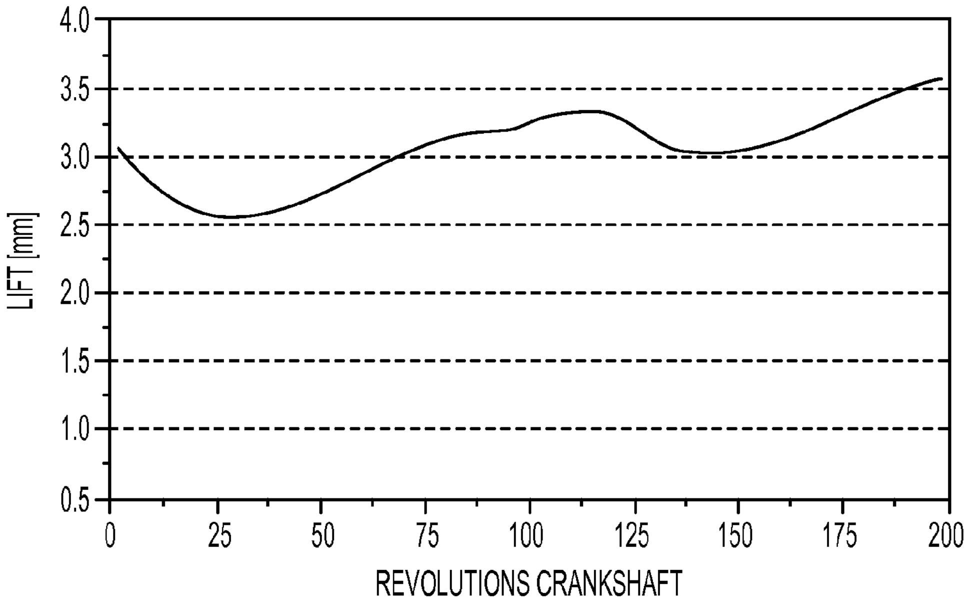
FIG. 4 is a graph that illustrates substantially minimized valve lift loss after a stepped return to idle maneuver was initiated and performed in accordance with an embodiment disclosed herein.

FIG. 4 is a graph that illustrates substantially minimized valve lift loss during a stepped return to idle maneuver performed in accordance with the method 100 described above. FIG. 4 shows test results for an engine that was running at 4,000 RPM for a period of time before initiating a stepped return to idle maneuver in accordance with the above method 100. As with the FIG. 1 example, oil aeration was set to 19%. The intermediate engine idle speed was approximately 1,000 RPM for this test and the normal engine idle speed was set to the typical 700 RPM. During the test, when the return to idle was initiated, the engine was allowed to dwell at the intermediate idle speed for about 6 to 7 seconds before dropping to the normal engine idle speed. In the illustrated example, there was an approximately 0.5 mm loss for a very short duration (i.e., approximately 50 crankshaft revolutions). Thus, valve lift lost was substantially minimized during the stepped return to idle maneuver performed in accordance with the method 100 disclosed herein.

What is claimed is:

1. A method of controlling an engine of a vehicle to set a speed of the engine to a predetermined idle speed, the method comprising:

determining, by a controller of the engine, an aeration of an oil utilized by a valve lift system configured to control valve lift of the engine;

determining, by the controller, whether the oil aeration is greater than a predetermined aeration threshold indicative of a potential stall of the engine due to valve lift loss;

when the oil aeration is greater than the predetermined aeration threshold, commanding, by the controller, the engine speed to an intermediate idle speed for a predetermined time period, the intermediate idle speed being greater than the predetermined idle speed; and in response to the predetermined time period expiring, commanding, by the controller, the engine speed to the predetermined idle speed.

2. The method of claim 1, wherein determining the oil aeration is based on how long the engine speed was at a predetermined speed.

3. The method of claim 2, wherein determining the oil aeration is further based on a temperature of the oil.

4. The method of claim 2, wherein determining the oil aeration is further based on signals indicative of how the vehicle is being driven.

5. The method of claim 1, wherein the intermediate idle speed is determined from a calibration process.

6. The method of claim 5, wherein the predetermined time period is determined from a calibration process.

7. The method of claim 1, wherein commanding the engine speed to the intermediate idle speed comprises controlling a timing of a solenoid valve configured to control opening and closing of at least one engine intake valve.

8. An engine system of a vehicle, the system comprising:

a solenoid valve connected to a cylinder head of the engine; and a controller in communication with the solenoid valve and the engine and configured to set a speed of the engine to a predetermined idle speed by:

determining an aeration of an oil utilized by a valve lift system configured to control valve lift of the engine;

determining whether the oil aeration is greater than a predetermined aeration threshold indicative of a potential stall of the engine due to valve lift loss;

when the oil aeration is greater than the predetermined aeration threshold, commanding the engine speed to an intermediate idle speed for a predetermined time period, the intermediate idle speed being greater than the predetermined idle speed; and in response to the predetermined time period expiring, commanding the engine speed to the predetermined idle speed.

9. The system of claim 8, wherein the intermediate idle speed is determined from a calibration process.

10. The system of claim 9, wherein the predetermined time period is determined from a calibration process.

11. The system of claim 8, wherein commanding the engine speed to the intermediate idle speed comprises controlling the timing of the solenoid valve to control opening and closing of at least one engine intake valve.

12. The system of claim 8, wherein determining the oil aeration is based on how long the engine speed was at a predetermined speed.

13. The system of claim 12, wherein determining the oil aeration is further based on a temperature of the oil.

14. The system of claim 12, wherein determining the oil aeration is further based on signals indicative of how the vehicle is being driven.

15. The system of claim 12, wherein determining the oil aeration is further based on a pressure of the oil.

16. The method of claim 1, wherein determining the oil aeration is further based on a pressure of the oil.

17. The method of claim 1, wherein the predetermined time period has a sufficient duration for the oil aeration to decrease below the predetermined aeration threshold.

18. The system of claim 8, wherein the predetermined time period has a sufficient duration for the oil aeration to decrease below the predetermined aeration threshold.

19. A system for an engine of a vehicle, the system comprising:

a valve lift system configured to control a lift of a valve of the engine, the valve configured to control airflow at least one of into and out of a cylinder of the engine, the valve lift system comprising an oil; and a controller configured to:

detect a request for a speed of the engine to decrease to a predetermined idle speed;

in response to detecting the request, determine an aeration of the oil indicative of an amount of air in the oil;

determine whether the oil aeration is greater than an aeration threshold indicative of a potential stall of the engine due to valve lift loss;

when the oil aeration is greater than the aeration threshold, commanding the engine speed to an intermediate speed greater than the predetermined idle speed; and when the oil aeration is less than the aeration threshold, commanding the engine speed to the predetermined idle speed.

* * * * *